United States Patent [19]

Brasseur et al.

[11] Patent Number: 5,567,764
[45] Date of Patent: Oct. 22, 1996

[54] CURABLE SILICONE COATINGS CONTAINING ALKOXY AND ALKENYL FUNCTIONAL SILOXANES

[75] Inventors: Michael J. Brasseur, Saginaw, Mich.; Kun-Long Chen, Taiwan, Taiwan

[73] Assignee: Dow Corning Corporation, Midland, Mich.

[21] Appl. No.: 508,783

[22] Filed: Jul. 28, 1995

[51] Int. Cl.$^6$ ........................................ C08K 5/06
[52] U.S. Cl. .................... 524/755; 528/12; 528/15; 524/765; 524/773; 427/515; 428/447
[58] Field of Search ................ 528/15, 12; 427/515; 524/773, 765, 755, 731, 837; 428/447

[56] References Cited

U.S. PATENT DOCUMENTS

| | | | |
|---|---|---|---|
| 2,823,218 | 2/1958 | Speier et al. | 260/448.2 |
| 3,122,522 | 2/1964 | Brown et al. | 260/46.5 |
| 3,175,993 | 3/1965 | Weyenberg | 260/46.5 |
| 3,419,593 | 12/1968 | Willing | 260/448.2 |
| 3,445,420 | 5/1969 | Kookootsedes et al. | 260/37 |
| 3,509,081 | 4/1970 | Gignac, Jr. | 260/18 |
| 3,527,659 | 9/1970 | Keil | 117/145 |
| 4,123,604 | 10/1978 | Sandford, Jr. | 528/31 |
| 4,154,174 | 5/1979 | Hockemeyer et al. | 260/31.2 |
| 4,465,818 | 8/1984 | Shirahata et al. | 528/12 |
| 4,472,563 | 9/1984 | Chandra et al. | 528/15 |
| 4,562,096 | 12/1985 | Lo et al. | 427/208.8 |
| 4,721,765 | 1/1988 | Inoue et al. | 528/18 |
| 4,743,474 | 5/1988 | Homan | 427/387 |
| 4,774,111 | 9/1988 | Lo | 427/387 |
| 5,049,635 | 9/1991 | Inoue | 528/18 |
| 5,053,442 | 10/1991 | Chu et al. | 523/212 |

FOREIGN PATENT DOCUMENTS 0108208  8/1983  European Pat. Off. .

*Primary Examiner*—Melvyn I. Marquis
*Attorney, Agent, or Firm*—Timothy J. Troy

[57] ABSTRACT

The present invention relates to the use of silicone anchorage additives in curable silicone coatings. The silicone anchorage additive of the invention is an alkoxy containing alkenyl functional organopolysiloxane, and these additives can be used in silicone coatings to provide superior anchorage while maintaining fast cure rates especially on films.

29 Claims, No Drawings

CURABLE SILICONE COATINGS CONTAINING ALKOXY AND ALKENYL FUNCTIONAL SILOXANES

BACKGROUND OF THE INVENTION

The present invention relates to a silicone anchorage additives and to their use in curable silicone coatings. More particularly, the present invention is related to alkoxy containing alkenyl functional organopolysiloxanes and to their use in curable silicone coatings.

Alkoxy containing polyorganosiloxanes have been described in the art. For example, Brown et al. in U.S. Pat. No. 3,122,522 discloses a siloxane compound wherein each molecule consists essentially of (1) at least two units of the formula $[R'(OCH_2CH_2)_cO]_aR_bSiZR_2SiO_{0.5}$ and (2) units of the formula $R_dSiO_{4-d/2}$ in which each R and R' is independently selected from the group consisting of monovalent hydrocarbon radicals and halogenated monovalent hydrocarbon radicals, each a has a value ranging from 2 to 3, each b has a value ranging from 0 to 1 in the sum of a+b in any units (1) being no greater than 3, each c has a value ranging from 1 to 2, each d has a value ranging from 0 to 2 and Z is a divalent hydrocarbon radical of from 2 to 18 inclusive carbon atoms, Z being free of aliphatic unsaturation, there being in each molecule of the ultimate siloxane composition units of (1) and (2) such that there is an average of from 1.3 to 2 R groups per silicon atom and that there are at least seven units of (2) per molecule.

Weyenberg in U.S. Pat. No. 3,175,993 discloses a composition consisting essentially of molecules of the average formula $R_ySi[(OSiR_2)_xZSiR_{3-a}(OR')_a]_{4-y}$ in which each R is free of aliphatic unsaturation and is selected from the group consisting of monovalent hydrocarbon radicals, monovalent halohydrocarbon radicals, and monovalent cyanoalkyl radicals all of 1 to 18 inclusive carbon atoms, Z is a divalent hydrocarbon radical free of aliphatic unsaturation of from 2 to 18 inclusive carbon atoms, R' is selected from the group consisting of haloalkyl radicals having no halogen alpha to the oxygen and alkyl radicals, both of less than 5 carbon atoms, y has an average value from 0 to 2 inclusive, x has a value of at least 3 and a has an average value from 2 to 3 inclusive.

Gignac in U.S. Pat. No. 3,509,081 discloses a cured elastomeric composition of matter obtained from a mixture of ingredients consisting essentially of (1) 100 parts of hydroxyl endblocked organopolysiloxane, (2) from 3 to 10 parts of a crosslinker selected from the group consisting of alkylpolysilicates, alkoxy silanes, and organosilicon compounds containing on the average at least three alkoxy radicals per molecule and at least two silicon atoms per molecule, at least some of the silicon atoms having hydrocarbon or halohydrocarbon radicals attached thereto, any remaining valences of the silicon atom being satisfied by substituents selected from the group consisting of oxygen atoms of SiOSi bonds, OH groups, and other silicon atoms, (3) from 0.1 part to 10 parts of a stannous salt of carboxylic acid, and (4) from 0.0002 to 0.005 part of a reducible azo-dye.

Alkoxy containing organopolysiloxanes have been disclosed in room temperature curable compositions and in moisture curable compositions. For example, Inoue et al., in U.S. Pat. No. 4,721,765 discloses a room temperature curable organopolysiloxane composition which comprises a hydroxyl or alkoxy terminated diorganopolysiloxane, a filler, an alkenyloxy silane, an organosilane or organopolysiloxane having at least one substituted or unsubstituted guanidino group, an amino containing organosilane, and an organic tin compound.

Homan in U.S. Pat. No. 4,743,474 discloses organopolysiloxane compositions which cure rapidly from the liquid to the non-liquid state when exposed to moisture which are used to rapidly coat a substrate. The organopolysiloxane compositions disclosed by Homan contain a large amount of a metal ester, such as tetraisopropyl titanate, dissolved in an organopolysiloxane fluid which contains moisture-reactive, silicon-bonded alkoxysilylorganic radicals.

Inoue in U.S. Pat. No. 5,049,635 discloses a room temperature curable organopolysiloxane composition which is capable of giving a cured silicone rubber having a low elastic modulus and low hardness and comprises (a) a silanol-terminated diorganopolysiloxane as the base component, (b) an organosilicon compound represented by the general formula $R^1R^2Si(-OCMe=CHCOOR^3)_2$, in which Me is a methyl group, $R^1$ is a methyl, vinyl, 3,3,3-trifluoropropyl or phenyl group, $R^2$ is a group selected from the class consisting of methyl, vinyl, trimethyl siloxy, vinyl dimethyl siloxy, divinyl methyl siloxy, trivinyl siloxy, and 3,3,3-trifluoropropyl dimethyl siloxy groups and $R^3$ is a methyl or ethyl group, (c) an organosilane or organosiloxane compound having, in a molecule, at least three groups selected from the class consisting of alkoxy groups, iminoxy groups, and alkenyloxy groups bonded to the silicon atom or atoms, and (d) an organosilane or organosiloxane compound having, in a molecule, at least one guanidino group represented by the formula $(R^4_2N)_2C=N-$, in which $R^4$ is a hydrogen atom or a monovalent hydrocarbon group.

Chu et al. in U.S. Pat. No. 5,053,442 discloses a process for producing a silicone sealant which is stable in the absence of moisture, cures when exposed to moisture, has an elongation at break of greater than 800 percent, and has adhesion to concrete. The silicon sealant is produced by first mixing an alkoxysilethylene endblocked polymer, a dialkyldialkoxysilane, and a titanium catalyst, then mixing in precipitated calcium carbonate filler having a fatty acid surface treatment.

In contrast, the present invention relates to an alkoxy containing alkenyl functional organopolysiloxane anchorage additive and to its use in silicone coatings. Nowhere in the art is described the use of the silicone anchorage additives of the present invention to improve anchorage in curable silicone coating compositions.

SUMMARY OF THE INVENTION

The present invention relates to trialkoxysilane or trialkoxysiloxane containing alkenyl functional organopolysiloxane anchorage additives and to their use in curable silicone coatings. The curable coating compositions of the present invention comprise the above organopolysiloxane anchorage additive, an organofunctional organopolysiloxane, at least one organohydrogensilicon compound, and a platinum group metal-containing catalyst. The curable coating compositions of the present invention can further comprise an inhibitor and/or a diluent.

It is an object of this invention to provide an additive capable of improving the adhesion and anchorage of silicone release coatings to a variety of substrates.

It is an additional object of this invention to provide organopolysiloxanes which improve the anchorage of films while maintaining fast cure rates.

It is another object of this invention to provide a curable coating composition which when applied to a substrate will releasably adhere a pressure sensitive adhesive composition.

It is further object of this invention to provide a method of making a cured coating such that cured coating has an improved anchorage to a variety of substrates.

DETAILED DESCRIPTION OF THE INVENTION

The first embodiment of the present invention relates to a curable silicone coating composition comprising: (A) a compound having its formula selected from the group consisting of:

(i) $RR^1R^2SiO(R_2SiO)_x(RR^1SiO)_y(RR^2SiO)_zSiRR^1R^2$, (ii) $RR^1R^2SiO(RR^1SiO)_y(RR^2SiO)_zSiRR^1R^2$, (iii) $RR^1R^2SiO(R_2SiO)_x(RR^2SiO)_zSiRR^1R^2$, (iv) $RR^1R^2SiO(R_2SiO)_x(RR^1SiO)_ySiRR^1R^2$, (v) $RR^1R^2SiO(R_2SiO)_xSiRR^1R^2$, (vi) $RR^1R^2SiO(RR_1SiO)_ySiRR^1R^2$, and (vii) $RR^1R^2SiO(RR^2SiO)_zSiRR^1R^2$, wherein R is a monovalent hydrocarbon or halohydrocarbon radical having from 1 to 20 carbon atoms, $R^1$ is selected from a group having the formula $-(CH_2)_nSi(OR)_3$, a group having the formula $-(CH_2)_n(R_2SiO)_xSi(OR)_3$, or R, $R^2$ is selected from vinyl, a group having the formula $-(CH_2)_mCH=CH_2$, or R wherein x has a value of from greater than zero to 9000, y has a value of from greater than zero to 1800, z has a value of from greater than zero to 900, the value of x+y+z is less than or equal to 9000, n has a value of from 2 to 20, m has a value of 1 to 18, with the proviso that there is at least one group having its formula selected from $-(CH_2)_nSi(OR)_3$ or $-(CH_2)_n(R_2SiO)_xSi(OR)_3$, and at least one vinyl group or a group having the formula $-(CH_2)_mCH=CH_2$ per compound; (B) at least one organohydrogensilicon compound; and (C) a platinum group metal-containing catalyst.

The monovalent radicals of R in compound (A) can contain up to 20 carbon atoms and include halohydrocarbon radicals free of aliphatic unsaturation and hydrocarbon radicals. Monovalent hydrocarbon radicals include alkyl radicals, such as methyl, ethyl, propyl, butyl, hexyl, octyl, and decyl; cycloaliphatic radicals, such as cyclohexyl; aryl radicals, such as phenyl, tolyl, and xylyl; aralkyl radicals, such as benzyl and phenylethyl. Highly preferred monovalent hydrocarbon radical for R is methyl and phenyl. Monovalent halohydrocarbon radicals free of aliphatic unsaturation include any monovalent hydrocarbon radical noted above which is free of aliphatic unsaturation and has at least one of its hydrogen atoms replaced with a halogen, such as fluorine, chlorine, or bromine. Preferred monovalent halohydrocarbon radicals have the formula $C_nF_{2n+1}CH_2CH_2-$ wherein the subscript n has a value of from 1 to 10, such as, for example, $CF_3CH_2CH_2-$ and $C_4F_9CH_2CH_2-$. The several R radicals can be identical or different, as desired and preferably at least 50 percent of all R radicals are methyl.

The groups suitable as $R^1$ in compound (A) are selected from groups having the formula $-(CH_2)_nSi(OR)_3$, groups having the formula $-(CH_2)_n(R_2SiO)_xSi(OR)_3$, or R. In the groups for $R^1$, n has a value of from 2 to 20, x has a value of from 1 to 1000, and R is as defined above including preferred embodiments thereof. It is preferred that x in $R^1$ have a value of greater than zero to 190. Examples of preferred groups for $R^1$ in the compounds of this invention are $-CH_2CH_2Si(OR)_3$, $-(CH_2)_3Si(OR)_3$, $-(CH_2)_4Si(OR)_3$, $-(CH_2)_5Si(OR)_3$, $-(CH_2)_6Si(OR)_3$, $-(CH_2)_8Si(OR)_3$, $-(CH_2)_{10}Si(OR)_3$ $-CH_2CH_2(R_2SiO)_xSi(OR)_3$, $-(CH_2)_3(R_2SiO)_xSi(OR)_3$, $-(CH_2)_4(R_2SiO)_xSi(OR)_3$, $-(CH_2)_5(R_2SiO)_xSi(OR)_3$, $-(CH_2)_6(R_2SiO)_xSi(OR)_3$, $-(CH_2)_8(R_2SiO)_xSi(OR)_3$, and $-(CH_2)_{10}(R_2SiO)_xSi(OR)_3$ where x has a value of from 10 to 1000 and where R is methyl or ethyl.

The groups suitable as $R^2$ in compound (A) include vinyl ($-CH=CH_2$), groups having the formula $-(CH_2)_mCH=CH_2$, or R. In the groups for $R^2$, m has a value of from 1 to 18 and R is as defined above. The groups suitable as $R^2$ are preferably selected from the group consisting of the vinyl radical and higher alkenyl radicals represented by the formula $-(CH_2)_mCH=CH_2$ where m has the value of from 1 to 10. Preferred higher alkenyl radicals contain at least 6 carbon atoms (i.e. where m is 4 or greater). For example, the higher alkenyl radicals may include 5-hexenyl, 6-heptenyl, 7-octenyl, 8-nonenyl, 9-decenyl, and 10-undecenyl. Alkenyl radicals selected from the group consisting of vinyl, 5-hexenyl, 7-octenyl, and 9-decenyl are preferred. The most preferred radicals are the vinyl radical and the 5-hexenyl radical.

It is preferred that x have a value of from greater than zero to 190, y has a value of from greater than zero to 5, and z has a value of from greater than zero to 10. It is also preferred that the sum of x+y+z is from 50 to 200.

The amount of Component (A) employed in the compositions of the present invention varies depending on the amount of organohydrogensilicon compound (B), and platinum group metal-containing catalyst (C), and the presence or absence of any optional ingredients. It is preferred that from 10 to 99 weight percent of (A) be used, and it is highly preferred that from 90 to 99 weight percent of (A) be employed, said weight percent being based on the total weight of the composition.

Component (B) comprises at least one organohydrogensilicon compound. Component (B) is preferably an organohydrogensilicon compound which is free of aliphatic unsaturation and contains two or more silicon atoms linked by divalent radicals, an average of from one to two silicon-bonded monovalent radicals per silicon atom and an average of at least one, and preferably two, three or more silicon-bonded hydrogen atoms per compound. Preferably the organohydrogensiloxane (B) contains an average of three or more silicon-bonded hydrogen atoms such as, for example, 5, 10, 20, 40, 70, 100, or more. The organohydrogensiloxane compounds suitable as Component (B) can be linear, branched, cyclic, and combinations thereof.

In terms of preferred monovalent hydrocarbon radicals, examples of organopolysiloxanes of the above formulae which are suitable as the organohydrogensiloxane (B) include $HMe_2SiO(Me_2SiO)_cSiMe_2H$, $(HMe_2SiO)_4Si$, cyclo-$(MeHSiO)_c$, $(CF_3CH_2CH_2)MeHSiO\{Me(CF_3CH_2CH_2)SiO\}_cSiHMe(CH_2CH_2CF_3)$, $Me_3SiO(MeHSiO)_cSiMe_3$, $HMe_2SiO(Me_2SiO)_{0.5c}(MeHSiO)_{0.5c}SiMe_2H$, $HMe_2SiO(Me_2SiO)_{0.5c}(MePhSiO)_{0.1c}(MeHSiO)_{0.4c}SiMe_2H$, $Me_3SiO(Me_2SiO)_{0.3c}(MeHSiO)_{0.7c}SiMe_3$ and $MeSi(OSiMe_2H)_3$ where c has a value of from about 0 to about 1000.

Highly preferred linear organohydrogenpolysiloxanes have the formula $YMe_2SiO(Me_2SiO)_p(MeySiO)_qSiMe_2Y$ wherein Y denotes a hydrogen atom or a methyl radical. An average of at least two Y radicals per compound must be hydrogen atoms. The subscripts p and q can have average values of zero or more and the sum of p plus q has a value equal to c, noted above. The disclosure of U.S. Pat. No.

4,154,714 shows highly-preferred organohydrogenpolysiloxanes.

Especially preferred as Component (B) are methylhydrogensiloxanes selected from the group consisting of bis(trimethylsiloxy)dimethyldihydrogendisiloxane, heptamethylhydrogentrisiloxane, hexamethyldihydrogentrisiloxane, methylhydrogencyclosiloxanes, pentamethylpentahydrogencyclopentasiloxane, pentamethylhydrogendisiloxane, polymethylhydrogensiloxanes, tetramethyltetrahydrogencyclotetrasiloxane, tetramethyldihydrogendisiloxane, and methylhydrogensiloxanedimethylsiloxane copolymers.

The amount of Component (B) employed varies depending on the amount of compound (A), platinum group metal-containing catalyst (C), and the presence or absence of any optional ingredients. It is preferred that from 0.5 to 90 weight percent of Component (B) be used, and it is highly preferred that from 1 to 10 weight percent of Component (B) be employed, said weight percent being based on the total weight of the composition.

Component (C) is any platinum group metal-containing catalyst component which facilitates the reaction of the silicon-bonded hydrogen atoms of Component (B) with the silicon-bonded olefinic hydrocarbon radicals of Component (A). By platinum group it is meant herein ruthenium, rhodium, palladium, osmium, iridium and platinum.

Component (C) is preferably a platinum containing catalyst component since they are the most widely used and available and because they provide a more favorable effect for the compositions of this invention in terms of improved release force. Platinum-containing catalysts can be a compound or complex of a platinum group metal. A preferred platinum-containing catalyst component in the compositions of this invention is a form of chloroplatinic acid, either as the commonly available hexahydrate form or as the anhydrous form, as taught by Speier, U.S. Pat. No. 2,823,218, incorporated herein by reference. A particularly useful catalyst is the composition that is obtained when chloroplatinic acid is reacted with an aliphatically unsaturated organosilicon compound such as divinyltetramethyldisiloxane, as disclosed by Willing, U.S. Pat. No. 3,419,593, incorporated herein by reference, because of its easy dispersibility in organosilicon systems.

The amount of platinum group metal-containing catalyst component that is used is not narrowly limited as long as there is a sufficient amount to accelerate a room temperature reaction between the silicon-bonded hydrogen atoms of Component (B) with olefinic hydrocarbon radicals of Component (A) and not so much as to make its action uncontrollable by the use of an inhibitor. The exact necessary amount of this catalyst component will depend on the particular catalyst utilized and is not easily predictable. However, for platinum containing catalysts the amount can be as low as one part by weight of platinum for every one million parts by weight of Component (A). Component (C) is preferably added at an amount of 10 to 10,000 parts for every one million parts of (A), and it is highly preferred that the amount is at 50 to 250 parts by weight of platinum for every one million parts by weight of (A).

The compositions of the present invention can further comprise an inhibitor. The inhibitor can be any material that is known to be, or can be, used to inhibit the catalytic activity of platinum group metal-containing catalysts. By the term "inhibitor" it is meant herein a material that retards the room temperature curing of a curable mixture of Components (A), (B), and (C), when incorporated therein in small amounts, such as less than 10 percent by weight of the composition, without preventing the elevated curing of the mixture.

Examples suitable inhibitors include ethylenically or aromatically unsaturated amides, acetylenic compounds, ethylenically unsaturated isocyanates, olefinic siloxanes, unsaturated hydrocarbon diesters, conjugated ene-ynes, hydroperoxides, nitriles, and diaziridines.

Preferred inhibitors include acetylenic alcohols such as those disclosed in U.S. Pat. No. 3,445,420, including ethynylcyclohexanol and methylbutynol, unsaturated carboxylic esters such as diallyl maleate and dimethyl maleate, maleates and fumarates such as those disclosed in U.S. Pat. Nos. 4,562,096 and 4,774,111, including diethyl fumarate, diallyl fumarate, and bis-(methoxyisopropyl) maleate, and conjugated ene-ynes such as those disclosed in U.S. Pat. Nos. 4,465,818, 4,472,563, and 4,559,396. The above-mentioned patents are incorporated herein by reference to teach how to prepare compounds which are suitable for use as an inhibitor in the compositions of this invention. Maleates and fumarates are the preferred inhibitors for the compositions of this invention. Bis-methoxyisopropyl maleate and diethyl fumarate are preferred as the inhibitors for the present invention.

The amount of inhibitor to be used in the compositions of this invention is not critical and can be any amount that will retard the above described catalyzed reaction at room temperature while not preventing said reaction at elevated temperature. No specific amount of inhibitor can be suggested to obtain a specified bath life at room temperature since the desired amount of any particular inhibitor to be used will depend upon the concentration and type of the platinum group metal containing catalyst, the nature and amounts of Components (A), (B), and (C), and the presence or absence of optional ingredients. It is preferred that from zero to 10 weight percent of inhibitor be used, said weight percent being based on the total weight of the composition. It is also preferred that from 0.5 to 1.5 percent of inhibitor be added to the total formulation if a maleate inhibitor is employed and from 0.8 to 2.0 percent if a fumarate inhibitor is used.

The compositions of the present invention can additionally comprise a bath life extender compound in a total amount sufficient to further retard the curing reaction at room temperature such as those described in Chung et al., U.S. Pat. No. 5,036,117 incorporated herein by reference. Examples of suitable bath life extender compounds include compounds which contain one or more primary or secondary alcohol groups, carboxylic acids (including compounds which yield carboxylic acids when exposed to water at room temperature), cyclic ethers, and water. Included in this group are the primary and secondary alcohols; diols and triols, such as ethylene glycol, propylene glycol and glycerine; partial ethers of diols and triols, such as 2- methoxyethanol, 2-methoxypropanol, and 2-methoxyisopropanol; tetrahydrofuran; water and aqueous solutions of mineral acids, alkalis, and salts. Primary and secondary alcohols, preferably having fewer than 10 carbon atoms are the most preferred for the compositions of this invention. Examples thereof include methanol, 1-butanol, 2-butanol, tetradecanol and other alkanols, such as ethanol, and normal-, and iso-propanol, iso-butanol, and the normal-, secondary-, and iso-pentanols, -hexanols, -heptanols, and -octanols; benzyl alcohol, phenol, and other aromatic alcohols such as methylphenyl carbinol, and 2-phenylethyl alcohol; allyl alcohol, and cyclohexanol. It is highly preferred that the bath life extender is benzyl alcohol or water.

The amount of bath life extender to be used in the compositions of this invention is not critical and is merely that amount that will provide a longer bath life for the composition than the bath life of an identical composition that does not contain the extender. The amount of Component bath life extender that is to be used can be as high as 10 percent by weight, based on the weight of Component (A). Preferably, the amount of bath life extender to be used in the compositions of this invention falls within the range of 0.1 to 5 percent, and most preferably 1 to 3 percent, by weight, based on the weight of Component (A).

The compositions of the present invention can further comprise a diluent. Examples of suitable diluents include aliphatic hydrocarbons such as pentane, hexane, heptane, octane, nonane, and the like; aromatic hydrocarbons such as benzene, toluene, and xylene; ketones such as acetone, methylethyl ketone, and methylisobutyl ketone, and halogenated diluents such as fluorine-, chlorine-, and bromine-, substituted aliphatic or aromatic hydrocarbons such as trichloroethane, perchloroethylene, bromobenzene, and the like. Two or more diluents may be used together.

The amount of diluent is not critical and may be readily determined by one skilled in the art. The compositions of this invention may contain up to 90 weight percent of diluent, however it is preferred that from about 70 to 90 weight percent be employed, said weight being based on the total weight of the composition.

The compositions of this invention can be prepared by homogeneously mixing Components (A),(B), and (C), and any optional components in any order, using any suitable mixing means, such as a spatula, a drum roller, a mechanical stirrer, a three-roll mill, a sigma blade mixer, a bread dough mixer, and a two-roll mill. The order of mixing Components (A) to (C) and any optional components is not critical, however, it is highly preferred that Components (A) and (C) be brought together in the presence of Component (B) and optionally an inhibitor, most preferably in a final mixing step. It is highly preferred to admix an inhibitor (if used) to Component (C) followed by (A), then a bath life extender (if used), and finally (B).

The second embodiment of the present invention relates to a curable silicone coating composition comprising (A) an organosilicon compound having at least two olefinic hydrocarbon radicals per compound, (B) at least one organohydrogensilicon compound, (C) a platinum group metal-containing catalyst, and (D) a compound having its formula selected from the group consisting of: (i) $R_2R^1SiO(R_2SiO)_x(RR^1SiO)_ySiR_2R^1$, (ii) $R_2R^1SiO(R_2SiO)_xSiR_2R^1$, and (iii) $R_2R^1SiO(RR^1SiO)_ySiR_2R^1$, wherein R is a monovalent hydrocarbon or halohydrocarbon radical having from 1 to 20 carbon atoms, $R^1$ is selected from a group having the formula $—(CH_2)_nSi(OR)_3$, a group having the formula $—(CH_2)_n(R_2SiO)_xSi(OR)_3$, or R, where x has a value of from greater than zero to 1000, y has a value of from greater than zero to 200, the value of x+y is less than or equal to 1000, and n has a value of from 2 to 20, with the proviso that there is at least one group having its formula selected from $—(CH_2)_nSi(OR)_3$ or $—(CH_2)_n(R_2SiO)_xSi(OR)_3$ per compound.

Component (A) is an organosilicon compound having at least two olefinic hydrocarbon radicals per compound. This component can be a solid or a liquid having any viscosity, such as a freely flowing, gum-like material or a hydrocarbon-soluble resin.

Multiple silicon atoms in Component (A) are linked by divalent radicals which include oxygen atoms, which provide siloxane bonds and aliphatically saturated hydrocarbon, hydrocarbon ether, halohydrocarbon ether and halohydrocarbon radicals which provide silcarbane bonds. The divalent radicals in Component (A) can be the same or different, as desired. Preferred divalent hydrocarbon radicals are 1–20 carbon atom alkylene radicals. The organopolysiloxane compounds suitable as Component (A) can be linear, branched, cyclic, and combinations thereof.

The olefinic hydrocarbon radicals of (A) may have from to 20 carbon atoms. The olefinic hydrocarbon radicals are preferably selected from the group consisting of the vinyl radical and higher alkenyl radicals represented by the formula $—R(CH_2)_mCH=CH_2$ wherein R denotes $—(CH_2)_n—$ or $—(CH_2)_pCH=CH—$ and m has the value of 1, 2, or 3, n has the value of 3 to 6, and p has the value of 3, 4, or 5. The higher alkenyl radicals represented by the formula $—R(CH_2)_mCH=CH_2$ contain at least 6 carbon atoms. For example, when R denotes $—(CH_2)_n—$, the higher alkenyl radicals include 5-hexenyl, 6-heptenyl, 7-octenyl, 8-nonenyl, 9-decenyl, and 10-undecenyl. When R denotes $—(CH_2)_pCH=CH—$, the higher alkenyl radicals include, among others, 4,7-octadienyl, 5,8-nonadienyl, 5,9-decadienyl, 6,11-dodecadienyl and 4,8-nonadienyl. Alkenyl radicals selected from the group consisting of 5-hexenyl, 7-octenyl, 9-decenyl, and 5,9-decadienyl, are preferred. It is more preferred that R denote $—(CH_2)_n—$ so that the radicals contain only terminal unsaturation and the most preferred radicals are the vinyl radical and the 5-hexenyl radical.

Specific examples of preferred polydiorganosiloxanes for use as Component (A) include
$ViMe_2SiO(Me_2SiO)_aSiMe_2Vi$,
$HexMe_2SiO(Me_2SiO)_aSiMe_2Hex$,
$Vi_2MeSiO(Me_2SiO)_aSiMeVi_2$,
$Hex_2MeSiO(Me_2SiO)_aSiMeHex_2$, $Vi_3SiO(Me_2SiO)_aSiVi_3$,
$Hex_3SiO(Me_2SiO)_aSiHex_3$,
$PhMeViSiO(Me_2SiO)_aSiPhMeVi$,
$HexMe_2SiO(Me_2SiO)_a(MeHexSiO)_bSiMe_2Hex$,
$ViMe_2SiO(Me_2SiO)_a(MeViSiO)_bSiMe_2Vi$,
$Hex_2MeSiO(Me_2SiO)_a(MeHexSiO)_bSiMeHex_2$,
$Vi_2MeSiO(Me_2SiO)_a(MeViSiO)_bSiMeVi_2$,
$Hex_3SiO(Me_2SiO)_a(MeHexSiO)_bSiHex_3$,
$Vi_3SiO(Me_2SiO)_a(MeViSiO)_bSiVi_3$, wherein Me, Vi, Hex, and Ph denote methyl, vinyl, 5-hexenyl and phenyl, a ranges from 0 to 1000 and b ranges from 0 to 100. The value of the subscripts a and b above are such that the siloxane polymer of Component (A) has a viscosity at 25° C. of at least 25 millipascal-seconds (mPa.s). Preferably a has a value of from 10 to 200, and b has a value of from 1 to 10.

The amount of Component (A) employed varies depending on the amount of organohydrogensilicon compound (B), platinum group metal-containing catalyst (C), compound (D), and the presence or absence of any optional ingredients. It is preferred that from greater than zero to 95 weight percent of (A) be used, and it is highly preferred that from 90 to 99 weight percent of (A) be employed, said weight percent being based on the total weight of the composition.

Component (B) comprises at least one organohydrogensilicon compound. The organohydrogensilicon compound, Component (B) is as defined hereinabove including preferred amounts and embodiments thereof. Especially preferred as Component (B) are methylhydrogensiloxanes, such as polymethylhydrogensiloxanes and methylhydrogensiloxanedimethylsiloxane copolymers.

The amount of Component (B) employed in the compositions of the present invention varies depending on the amount of organosilicon compound (A), platinum group metal-containing catalyst (C), compound (D), and the presence or absence of any optional ingredients. It is preferred that from 0.5 to 90 weight percent of Component (B) be used, and it is highly preferred that from 1 to 10 weight percent of Component (B) be employed, said weight percent being based on the total weight of the composition.

Component (C) is a platinum group metal-containing catalyst. The platinum group metal-containing catalyst (C) of this invention, is as defined hereinabove including preferred amounts and embodiments thereof. Especially preferred as Component (C) is chloroplatinic acid or chloroplatinic acid reacted with an aliphatically unsaturated organosilicon compound such as divinyltetramethyldisiloxane. It is preferred that the amount of (C) is about 50 to 250 parts by weight of platinum for every one million parts by weight of (A).

Compound (D) is a compound having its formula selected from the group consisting of: (i) $R_2R^1SiO(R_2SiO)_x(RR^1SiO)_ySiR_2R^1$, (ii) $R_2R^1SiO(R_2SiO)_xSiR_2R^1$, and (iii) $R_2R^1SiO(RR^1SiO)_ySiR_2R^1$. The monovalent radicals of R in compound (D) of the instant invention are as delineated above. Highly preferred monovalent hydrocarbon radicals for R are methyl or phenyl. The group $R^1$ is as defined in the first embodiment of this invention, including preferred embodiments thereof. It is preferred that x in $R^1$ have a value of greater than zero to 190.

It is preferred that x have a value of from greater than zero to 190 and y has a value of from greater than zero to 5. It is also preferred that the sum of x+y is from 20 to 200.

The amount of Component (D) employed in the compositions of the present invention varies depending on the amount of organosilicon compound (A), organohydrogensilicon compound (B), platinum group metal-containing catalyst (C), and the presence or absence of any optional ingredients. It is preferred that from greater than zero to 25 weight percent of (D) be used, and it is highly preferred that from 1 to 10 weight percent of (D) be employed, said weight percent being based on the total weight of the composition.

The curable coating compositions of the second embodiment of this invention can further comprise an inhibitor, bath life extender, and/or diluent. The inhibitor, bath life extender, and/or diluent are all as delineated above, including amounts and preferred embodiments thereof. The compositions of the second embodiment of this invention can be prepared by homogeneously mixing Components (A), (B), (C), and (D) and any optional components in any order, using any suitable mixing means, such as a spatula, a drum roller, a mechanical stirrer, a three-roll mill, a sigma blade mixer, a bread dough mixer, and a two-roll mill. The order of mixing Components (A) to (D) and any optional components is not critical, however, it is highly preferred that Components (A), (C), and (D) be brought together in the presence of Component (B) and optionally an inhibitor, most preferably in a final mixing step. It is highly preferred to admix an inhibitor (if used) to Component (C) followed by (A) and (D), then a bath life extender (if used), and finally (B).

The compositions of this invention can contain any optional components commonly used in platinum group metal catalyzed organosilicon compositions, such as reinforcing and extending fillers, hydrocarbons and halohydrocarbons free of aliphatic unsaturation, colorants, stabilizers, adhesion modifiers, adhesive-release modifiers, etc. In particular, the coating compositions of this invention which have adhesive-releasing properties can further comprise the well-known high release additives of the art.

The compositions of this invention have utility as formable compositions to provide organosilicon articles such as 0-rings, tubing, wire-coating, gaskets, encapsulant and sealant compositions, and as coating compositions. The compositions of the present invention have particular utility as release coatings.

In another aspect the present invention relates to a method for making a cured coating, the method comprising the steps of: (I) coating a curable silicone coating composition on the surface of a substrate wherein the composition comprises the composition of the first embodiment of this invention delineated hereinabove or the composition comprises the composition of the second embodiment of this invention delineated hereinabove, and (II) exposing the coating and substrate to atmospheric moisture or to an energy source selected from the group consisting of (i) heat and (ii) actinic radiation in an amount sufficient to cure the coating. The method of this invention can further comprise (III) applying an adhesive on the coating. In the method of this invention the curable silicone coating composition is the composition of the first or second embodiment of this invention as delineated above and optionally inhibitor, bath life extender, and/or diluent which are all delineated above, including amounts and preferred embodiments thereof.

By actinic radiation it is meant ultraviolet light; electron beam radiation; and alpha-, beta-, gamma- and x-rays. By heat it is meant infrared radiation, hot-air, microwave radiation, etc. Of course actinic radiation is frequently accompanied by heat and the use of a combination of the two falls within the scope and spirit of the present process. In the preferred process of this invention, the coating process can be accomplished by any suitable manner known in the art, such as by spreading, brushing, extruding, spraying, gravure, kiss-roll and air-knife.

In a preferred embodiment of the instant process the solid substrate is a flexible sheet material such as paper, polyolefin film and polyolefin-coated paper or foil. Other suitable solid substrates that can be coated by the process of this invention include other cellulosic materials such as wood, cardboard and cotton; metallic materials such as aluminum, copper, steel and silver; siliceous materials such as glass and stone; and synthetic polymer materials such as polyolefins, polyamides, polyesters and polyacrylates. As to form the solid substrate can be substantially sheet-like, such as a peelable release liner for pressure sensitive adhesive; a fabric or a foil; or substantially three-dimensional in form.

After the liquid curable composition has been coated onto a substrate it is heated and/or irradiated with actinic radiation, as noted herein, to cure the liquid coating and to adhere it to the substrate.

In a preferred embodiment of the process of this invention, a flexible sheet material, such as paper, metal foil or tapestock, is coated with a thin coating of the liquid curable composition, preferably in a continuous manner and the thus-coated material is then heated and/or irradiated to rapidly cure the coating, to provide a sheetlike material bearing on at least one surface thereof an adhesive-releasing coating. The adhesive-releasing coating is subsequently brought into contact with a pressure sensitive adhesive, preferably in an in-line manner, to form an article having a peelable, i.e. releasable, adhesive/coating interface. Examples of such an article include, adhesive labels having a peelable backing, adhesive tape in roll form and adhesive packaged in a strippable container. The pressure sensitive adhesive can be non-silicone-based, such as the well-known acrylic or rubber types or silicone-based, such as the peroxide-or platinum-curable polydiorganosiloxane-based adhesives.

The process of this invention is also applicable to adhesive materials, other than pressure sensitive adhesives. Examples of said adhesive materials include foods, asphalt and gum polymers.

The following examples are disclosed to further teach, but not limit, the invention which is properly delineated by the appended claims. All amounts (parts and percentages) are by weight unless otherwise indicated. Viscosities were measured with a rotating spindle viscometer (1 centistoke (cS)=1 mm²/s).

The no smear condition was determined by lightly streaking the coating with a finger and observing for the absence of haze in the streaked area.

The no migration condition was determined by firmly adhering a common, pressure sensitive adhesive tape to the coating, removing the tape and folding the removed tape together, adhesive surfaces to each other. Absence of migration of the coating to the tape was indicated by noting that the doubled tape was as difficult to separate as unused tape so doubled.

The no rub-off condition was determined by vigorously rubbing the coating with the index finger and noting that the coating could not be removed from the paper. The examples hereinbelow are expressed in days to rub off, that is, time it takes for the coating to show signs of actually breaking apart and separating from the paper or film due to the force of a rubbing finger.

Cure time for a composition means the time interval required for the composition, when coated onto S2S kraft paper, at a thickness of 1 pound per ream, to attain the no smear, no migration, no rub-off condition.

EXAMPLES 1–4

The effectiveness of the compounds of the instant invention in enhancing the anchorage age of cured silicone coatings to organic films and paper was tested.

Into a 500 ml flask was added about 0.06 grams of a platinum catalyst (a soluble platinum complex containing 0.67% platinum formed from chloroplatinic acid and divinyltetramethyldisiloxane) and 100 grams of a siloxane compound, (i), (ii), (iii), or (iv) delineated hereinbelow, and this mixture was then stirred. Siloxane compound (i) is a compound having the general formula HexMe$_2$SiO(Me$_2$SiO)$_a$(MeHexSiO)$_b$SiMe$_2$Hex having 2 mole percent (%) hexenyl groups and having a degree of polymerization of about 100, Siloxane compound (ii) is a compound having the general formula HexMe$_2$SiO(Me$_2$SiO)$_a$(MeHexSiO)$_b$SiMe$_2$Hex having 2 mole % hexenyl groups and having a degree of polymerization of about 150, and Siloxane compound (iii) is a compound having the general formula HexMe$_2$SiO(Me$_2$SiO)aSiMe$_2$Hex having a degree of polymerization of about 30. In the above formulae, Me denotes methyl and Hex denotes hexenyl. Siloxane compound (iv) is a compound having the general formula ViMe$_2$SiO(Me$_2$SiO)$_a$(MeViSiO)$_b$SiMe$_2$Vi having 2 mole % vinyl groups and having a viscosity of about 350 mm²/s, wherein Me denotes methyl and Vi denotes vinyl. Next, an amount of trimethoxy silane (MeO3SiH) delineated in Table I hereinbelow, was added to the mixture in the flask. This mixture was then stirred thoroughly and checked by IR (Infrared Spectroscopy) for any residual SiH groups. The reaction was considered complete when no residual SiH groups could be detected.

TABLE I

| Ex. | Siloxane | Trimethoxysilane (grams) |
|---|---|---|
| 1 | i | 0.74 |
| 2 | ii | 1.11 |

TABLE I-continued

| Ex. | Siloxane | Trimethoxysilane (grams) |
|---|---|---|
| 3 | iii | 4.70 |
| 4 | iv | 1.11 |

The resulting compounds had the following average formulae:

Compound (A):

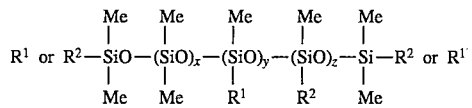

wherein $R^1$ denotes the group —(CH$_2$)$_6$Si(OMe)$_3$ and $R^2$ denotes the group —(CH$_2$)$_4$CH=CH$_2$ (hexenyl), the value of y+z is about 1.3 mole %, the value of $R^1$ is about 0.45 mole %, about 96.7 mole % dimethylsiloxane groups were present, and wherein the value of x+y+z is about 100;

Compound (B):

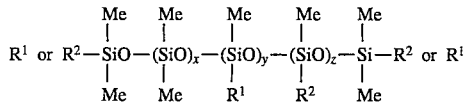

wherein $R^1$ denotes the group —(CH$_2$)$_6$Si(OMe)$_3$ and $R^2$ denotes the group —(CH$_2$)$_4$CH=CH$_2$ (hexenyl), the value of y+z is about 2.0 mole %, the value of $R^1$ is about 0.67 mole %, about 96.7 mole % dimethylsiloxane groups were present, and wherein the value of x+y+z is about 150;

Compound (C):

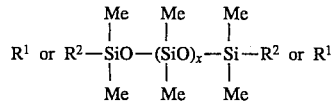

wherein $R^1$ denotes the group —(CH$_2$)$_6$Si(OMe)$_3$ and $R^2$ denotes the group —(CH$_2$)$_4$CH=CH$_2$ (hexenyl), the value of $R^1+R^2$ is about 6.7 mole %, the value of $R^1$ is about 3.0 mole %, and wherein the value of x is about 30;

Compound (D):

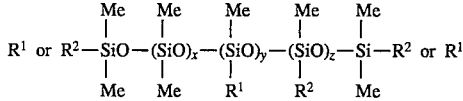

wherein $R^1$ denotes the group —(CH$_2$)$_2$Si(OMe)$_3$ and $R^2$ denotes the group —CH=CH$_2$ (vinyl), the value of y+z is about 2.0 mole %, the value of $R^1$ is about 0.67 mole %, about 96.7 mole % dimethylsiloxane groups were present, and wherein the value of x+y+z is about 150;

EXAMPLES 5–8

The above compounds, (A), (B), (C), and (D) were next added to various curable silicone coatings. Into a 4 ounce jar was added about 96.9 grams of a compound ((A) or (B)), about 1.85 grams of a platinum catalyst (a soluble platinum complex containing 0.67% platinum formed from chloroplatinic acid and divinyltetramethyldisiloxane), about 0.9 grams of diethyl fumarate, and about 0.4 grams of benzyl alcohol and the resulting mixture was stirred. Next, about 4.2 grams of a trimethylsiloxy-endblocked-polydimethylsiloxane-methylhydrogensiloxane copolymer having a total average degree of polymerization of about 40 and about 70 mole % methylhydrogen moiety on the siloxane chain was added to this mixture and the resulting mixture was stirred. The mixture containing compound (A) is denoted as Silicone Coating A and the mixture containing compound (B) is denoted as Silicone Coating (B) in Table II hereinbelow.

Into a 4 ounce jar was added about 5 grams of compound (C) and about 95 grams of a premix which was prepared by mixing about 96.9 grams of a compound having the formula HexMe$_2$SiO(Me$_2$SiO)$_a$(MeHexSiO)$_b$SiMe$_2$Hex having 2 mole % hexenyl groups and having a degree of polymerization of about 150, about 1.85 grams of a platinum catalyst (a soluble platinum complex containing 0.67% platinum formed from chloroplatinic acid and divinyltetramethyldisiloxane), about 0.9 grams of diethyl fumarate, and about 0.4 grams of benzyl alcohol and the mixture containing compound (C) and the mixture was stirred. Next, about 4.2 grams of a trimethylsiloxy-endblocked-polydimethylsiloxane-methylhydrogensiloxane copolymer having a total average degree of polymerization of about 40 and about 70 mole % methylhydrogen moiety on the siloxane chain was added to the mixture containing compound (C) and the resulting mixture was stirred. This mixture is denoted as Silicone Coating (C) in Table II hereinbelow.

Into a 4 ounce jar was added about 97.1 grams of compound (D), about 1.85 grams of a platinum catalyst (a soluble platinum complex containing 0.67% platinum formed from chloroplatinic acid and divinyltetramethyldisiloxane), and about 1.05 grams of bis(2-methoxy-1-methylethyl) maleate and this mixture was stirred. Next, about 4.63 grams of a trimethylsiloxy-endblocked-polydimethylsiloxane-methylhydrogensiloxane copolymer having a total average degree of polymerization of about 40 and about 70 mole % methylhydrogen moiety on the siloxane chain was added to the mixture containing compound (D) and the resulting mixture was stirred. This mixture is denoted as Silicone Coating (D) in Table II hereinbelow.

For comparison, a silicone coating which did not contain a compound of the instant invention was prepared by mixing about 96.9 grams of a compound having the formula HexMe$_2$SiO(Me$_2$SiO)$_a$(MeHexSiO)$_b$SiMe$_2$Hex having 2 mole % hexenyl groups and having a degree of polymerization of about 150, about 1.85 grams of a platinum catalyst (a soluble platinum complex containing 0.67% platinum formed from chloroplatinic acid and divinyltetramethyldisiloxane), about 0.9 grams of diethyl fumarate, and about 0.4 grams of benzyl alcohol and the mixture was stirred. Next, about 4.2 grams of a trimethylsiloxy-endblocked-polydimethylsiloxane-methylhydrogensiloxane copolymer having a total average degree of polymerization of about 40 and about 70 mole % methylhydrogen moiety on the siloxane chain was added to this mixture the resulting mixture was stirred. This mixture is denoted as Silicone Coating (A') in Table II hereinbelow. Silicone Coatings (A), (B), (C), (D) and the comparison silicone coating (A') were then cured and tested for Rub-Off according to the procedures delineated hereinabove. Performance was determined by the number of days it took before evidence of rub-off could be detected in the coating. The results are reported in Table II hereinbelow.

TABLE II

| Silicone Coating | Cure Temp. (°C.) | Cure Time (sec.) | Ruboff (Days) | Substrate Type |
|---|---|---|---|---|
| A | 99 | 10 | <1 | CLAY COATED PAPER |
| B | 99 | 15 | <1 | CLAY COATED PAPER |
| C | 99 | 15 | 3 | CLAY COATED PAPER |
| A' | 99 | 10 | Immediate | CLAY COATED PAPER |
| A' | 99 | 15 | Immediate | CLAY COATED PAPER |
| A | 99 | 15 | 8 | POLYETHYLENE FILM |
| B | 99 | 15 | 8 | POLYETHYLENE FILM |
| C | 99 | 15 | 8 | POLYETHYLENE FILM |
| A' | 99 | 15 | 3 | POLYETHYLENE FILM |
| A | 110 | 72 | 5 | POLYPROPYLENE FILM |
| D | 110 | 24 | 5 | POLYPROPYLENE FILM |
| A' | 110 | 72 | 3 | POLYPROPYLENE FILM |
| A' | 110 | 24 | 3 | POLYPROPYLENE FILM |
| A | 99 | 15 | 67 | POLYESTER FILM |
| A | 149 | 5 | 70 | POLYESTER FILM |
| A' | 99 | 15 | 1 | POLYESTER FILM |
| A' | 149 | 5 | 1 | POLYESTER FILM |
| B | 121 | 6 | 30 | POLYESTER FILM |
| A' | 121 | 6 | 1 | POLYESTER FILM |

It can be seen from Table II hereinabove that the silicone coatings of the present invention displayed superior anchorage in comparison to silicone coating A' on various substrates.

That which is claimed is:

1. A curable silicone coating composition comprising:
   (A) a compound having its formula selected from the group consisting of:
   (i) RR$^1$R$^2$SiO(R$_2$SiO)$_x$(RR$^1$SiO)$_y$(RR$^2$SiO)$_z$SiRR$^1$R$^2$,
   (ii) RR$^1$R$^2$SiO(RR$^1$SiO)$_y$(RR$^2$SiO)$_z$SiRR$^1$R$^2$,
   (iii) RR$^1$R$^2$SiO(R$_2$SiO)$_x$(RR$^2$SiO)$_z$SiRR$^1$R$^2$,
   (iv) RR$^1$R$^2$SiO(R$_2$SiO)$_x$(RR$^1$SiO)$_y$SiRR$^1$R$^2$,
   (v) RR$^1$R$^2$SiO(R$_2$SiO)$_x$SiRR$^1$R$^2$,
   (vi) RR$^1$R$^2$SiO(RR$^1$SiO)$_y$SiRR$^1$R$^2$, and
   (vii) RR$^1$R$^2$SiO(RR$^2$SiO)$_z$SiRR$^1$R$^2$,
   wherein R is a monovalent hydrocarbon or halohydrocarbon radical having from 1 to 20 carbon atoms, R$^1$ is selected from a group having the formula —(CH$_2$)$_n$Si(OR)$_3$, a group having the formula —(CH$_2$)$_n$(R$_2$SiO)$_x$Si(OR)$_3$, or R, R$^2$ is selected from vinyl, a group having the formula —(CH$_2$)$_m$CH=CH$_2$, or R wherein x has a value of from greater than zero to 9000, y has a value of from greater than zero to 1800, z has a value of from greater than zero to 900, the value of x+y+z is less than or equal to 9000, n has a value of from 2 to 20, m has a value of from 1 to 18, with the proviso that there is at least one group having its formula selected from —(CH$_2$)$_n$Si(OR)$_3$ or —(CH$_2$)$_n$(R$_2$SiO)$_x$Si(OR)$_3$, and at least one vinyl group or the group having the formula —(CH$_2$)$_m$CH=CH$_2$ per compound;
   (B) at least one organohydrogensilicon compound; and
   (C) a platinum group metal-containing catalyst.

2. A composition according to claim 1, wherein R$^1$ is selected from the group consisting of —CH$_2$CH$_2$Si(OR)$_3$, —$(CH_2)_3Si(OR)_3$, —$(CH_2)_4Si(OR)_3$, —$(CH_2)_5Si(OR)_3$, —$(CH_2)_6Si(OR)_3$, —$(CH_2)_8Si(OR)_3$, —$(CH_2)_{10}Si(OR)_3$, —$CH_2CH_2(R_2SiO)_xSi(OR)_3$, —$(CH_2)_3(R_2SiO)_xSi(OR)_3$, —$(CH_2)_4(R_2SiO)_xSi(OR)_3$, —$(CH_2)_5(R_2SiO)_xSi(OR)_3$, —$(CH_2)_6(R_2SiO)_xSi(OR)_3$, —$(CH_2)_8(R_2SiO)_xSi(OR)_3$, and —$(CH_2)_{10}(R_2SiO)_xSi(OR)_3$ wherein x has a value of from 10 to 1000 and wherein R is methyl or ethyl.

3. A composition according to claim 1, wherein $R^2$ is selected from —$CH=CH_2$ or —$(CH_2)_4CH=CH_2$.

4. A composition according to claim 1, wherein x has a value of from greater than zero to 190, y has a value of from greater than zero to 5, and z has a value of from greater than zero to 10.

5. A composition according to claim 1, wherein (B) is selected from the group consisting of
bis(trimethylsiloxy)dimethyldihydrogendisiloxane,
heptamethylhydrogentrisiloxane, hexamethyldihydrogentrisiloxane,
methylhydrogencyclosiloxanes,
pentamethylpentahydrogencyclopentasiloxane,
pentamethylhydrogendisiloxane, polymethylhydrogensiloxanes,
tetramethyltetrahydrogencyclotetrasiloxane,
tetramethyldihydrogendisiloxane, and
methylhydrogensiloxane-dimethylsiloxane copolymers.

6. A composition according to claim 1, wherein (C) is selected from chloroplatinic acid or chloroplatinic acid-divinyltetramethyldisiloxane complexes.

7. A composition according to claim 1, wherein the composition further comprises an inhibitor.

8. A composition according to claim 7, wherein the inhibitor is selected from the group consisting of maleates and fumarates.

9. A composition according to claim 7, wherein the composition further comprises a bath life extender compound.

10. A composition according to claim 9, wherein the bath life extender compound is a compound selected from the group consisting of compounds which contain one or more primary or secondary alcohol groups, carboxylic acids, compounds which yield carboxylic acids when exposed to water at room temperature, cyclic ethers, and water.

11. A composition according to claim 1, wherein the composition further comprises a diluent.

12. A curable silicone coating composition comprising:
(A) an organosilicon compound having at least two olefinic hydrocarbon radicals per compound;
(B) at least one organohydrogensilicon compound; and
(C) a platinum group metal-containing catalyst; and
(D) a compound having its formula selected from the group consisting of:
(i) $R_2R^1SiO(R_2SiO)_x(RR^1SiO)_ySiR_2R^1$,
(ii) $R_2R^1SiO(R_2SiO)_xSiR_2R^1$, and
(iii) $R_2R^1SiO(RR^1SiO)_ySiR_2R^1$,
wherein R is a monovalent hydrocarbon or halohydrocarbon radical having from 1 to 20 carbon atoms, $R^1$ is selected from a group having the formula —$(CH_2)_nSi(OR)_3$, a group having the formula —$(CH_2)_n(R_2SiO)_xSi(OR)_3$, or R, wherein x has a value of from greater than zero to 1000, y has a value of from greater than zero to 200, the value of x+y is less than or equal to 1000, and n has a value of from 2 to 20, with the proviso that there is at least one group having its formula selected from —$(CH_2)_nSi(OR)_3$ or —$(CH_2)_n(R_2SiO)_xSi(OR)_3$ per compound.

13. A composition according to claim 12, wherein (A) is selected from the group consisting of
$ViMe_2SiO(Me_2SiO)_aSiMe_2Vi$,
$HexMe_2SiO(Me_2SiO)_aSiMe_2Hex$,
$Vi_2MeSiO(Me_2SiO)_aSiMeVi_2$,
$Hex_2MeSiO(Me_2SiO)_aSiMeHex_2$, $Vi_3SiO(Me_2SiO)_aSiVi_3$,
$Hex_3SiO(Me_2SiO)_aSiHex_3$,
$PhMeViSiO(Me_2SiO)_aSiPhMeVi$,
$HexMe_2SiO(Me_2SiO)_a(MeHexSiO)_bSiMe_2Hex$,
$ViMe_2SiO(Me_2SiO)_a(MeViSiO)_bSiMe_2Vi$,
$Hex_2MeSiO(Me_2SiO)_a(MeHexSiO)_bSiMeHex_2$,
$Vi_2MeSiO(Me_2SiO)_a(MeViSiO)_bSiMeVi_2$,
$Hex_3SiO(Me_2SiO)_a(MeHexSiO)_bSiHex_3$, and
$Vi_3SiO(Me_2SiO)_a(MeViSiO)_bSiVi_3$, wherein Me, Vi, Hex, and Ph denote methyl, vinyl, 5-hexenyl, and phenyl, respectively and a has a value of from 0 to 1000, and b has a value of from 0 to 100.

14. A composition according to claim 12, wherein (B) is selected from the group consisting of
bis(trimethylsiloxy)dimethyldihydrogendisiloxane,
heptamethylhydrogentrisiloxane, hexamethyldihydrogentrisiloxane,
methylhydrogencyclosiloxanes,
pentamethylpentahydrogencyclopentasiloxane,
pentamethylhydrogendisiloxane, polymethylhydrogensiloxanes,
tetramethyltetrahydrogencyclotetrasiloxane,
tetramethyldihydrogendisiloxane, and methylhydrogensiloxanedimethylsiloxane copolymers.

15. A composition according to claim 12, wherein (C) is selected from chloroplatinic acid or chloroplatinic acid-divinyltetramethyldisiloxane complexes.

16. A composition according to claim 12, wherein $R^1$ is selected from the group consisting of —$CH_2CH_2Si(OR)_3$, —$(CH_2)_3Si(OR)_3$, —$(CH_2)_4Si(OR)_3$, —$(CH_2)_5Si(OR)_3$, —$(CH_2)_6Si(OR)_3$, —$(CH_2)_8Si(OR)_3$, —$(CH_2)_{10}Si(OR)_3$, —$CH_2CH_2(R_2SiO)_xSi(OR)_3$, —$(CH_2)_3(R_2SiO)_xSi(OR)_3$, —$(CH_2)_4(R_2SiO)_xSi(OR)_3$, —$(CH_2)_5(R_2SiO)_xSi(OR)_3$, —$(CH_2)_6(R_2SiO)_xSi(OR)_3$, —$(CH_2)_8(R_2SiO)_xSi(OR)_3$, and —$(CH_2)_{10}(R_2SiO)_xSi(OR)_3$ wherein x has a value of from 10 to 1000 and wherein R is methyl or ethyl.

17. A composition according to claim 12, wherein the composition further comprises an inhibitor.

18. A composition according to claim 17, wherein the inhibitor is selected from the group consisting of maleates and fumarates.

19. A composition according to claim 17, wherein the composition further comprises a bath life extender compound.

20. A composition according to claim 19, wherein the bath life extender compound is a compound selected from the group consisting of compounds which contain one or more primary or secondary alcohol groups, carboxylic acids including compounds which yield carboxylic acids when exposed to water at room temperature, cyclic ethers, and water.

21. A composition according to claim 12, wherein the composition further comprises a diluent.

22. A method of making a cured coating, the method comprising the steps of:
(I) coating a curable silicone coating composition on the surface of a substrate wherein the coating composition comprises the composition of claim 1; and
(II) exposing the coating and the substrate to atmospheric moisture or an energy source selected from the group consisting of (i) heat and (ii) actinic radiation in an amount sufficient to cure the coating.

23. A method according to claim 22, wherein the method further comprises the step of: (III) applying a pressure sensitive adhesive on the coating after step (II).

24. A method for making a cured coating, the method comprising the steps of:
   (I) coating a curable silicone coating composition on the surface of a substrate wherein the composition comprises the composition of claim 12; and
   (II) exposing the coating and the substrate to atmospheric moisture or an energy source selected from the group consisting of (i) heat and (ii) actinic radiation in an amount sufficient to cure the coating.

25. A method according to claim 24, wherein the method further comprises the step of (III) applying a pressure sensitive adhesive on the coating after step (II).

26. A cured coating produced in accordance with the method of claim 22.

27. A cured coating produced in accordance with the method of claim 23.

28. A cured coating produced in accordance with the method of claim 24.

29. A cured coating produced in accordance with the method of claim 25.

* * * * *